(12) United States Patent
Zubizarreta et al.

(10) Patent No.: US 12,440,344 B2
(45) Date of Patent: Oct. 14, 2025

(54) CONSTRAINED ORTHOPAEDIC IMPLANTS AND METHODS OF REPAIR

(71) Applicant: ARTHREX, INC., Naples, FL (US)

(72) Inventors: Joel Zubizarreta, Naples, FL (US); Gregory Guederian, Naples, FL (US)

(73) Assignee: ARTHREX, INC., Naples, FL (US)

( * ) Notice: Subject to any disclaimer, the term of this patent is extended or adjusted under 35 U.S.C. 154(b) by 112 days.

(21) Appl. No.: 18/471,720

(22) Filed: Sep. 21, 2023

(65) Prior Publication Data

US 2025/0099253 A1     Mar. 27, 2025

(51) Int. Cl.
*A61F 2/40*     (2006.01)
*A61F 2/30*     (2006.01)

(52) U.S. Cl.
CPC .............. *A61F 2/4081* (2013.01); *A61F 2/40* (2013.01); *A61F 2002/30112* (2013.01); *A61F 2002/4018* (2013.01)

(58) Field of Classification Search
CPC .. A61F 2/40; A61F 2/4081; A61F 2002/4022; A61F 2002/30326
See application file for complete search history.

(56) References Cited

U.S. PATENT DOCUMENTS

| | | | |
|---|---|---|---|
| 4,261,062 A | 4/1981 | Amstutz et al. | |
| 5,080,673 A | 1/1992 | Burkhead et al. | |
| 5,800,551 A | 9/1998 | Williamson et al. | |
| 6,364,910 B1 | 4/2002 | Shultz et al. | |
| 7,959,680 B2 | 6/2011 | Stone et al. | |
| 8,535,319 B2 | 9/2013 | Ball | |
| 8,721,727 B2 | 5/2014 | Ratron et al. | |
| 8,882,845 B2 | 11/2014 | Wirth et al. | |
| 9,433,507 B2 | 9/2016 | Reubelt et al. | |
| 9,474,619 B2 | 10/2016 | Reubelt et al. | |
| 9,610,166 B2 | 4/2017 | Gunther et al. | |
| 2006/0079963 A1 | 4/2006 | Hansen | |
| 2007/0225818 A1 | 9/2007 | Reubelt et al. | |
| 2011/0276144 A1* | 11/2011 | Wirth ................... | A61F 2/4081 623/19.13 |
| 2017/0042689 A1 | 2/2017 | Goldberg | |
| 2021/0244547 A1 | 8/2021 | Gunther et al. | |
| 2023/0078024 A1 | 3/2023 | Gunther et al. | |
| 2023/0080207 A1 | 3/2023 | Gunther et al. | |

FOREIGN PATENT DOCUMENTS

EP     2566417 A1     3/2013

OTHER PUBLICATIONS

International Search Report and Written Opinion for International Application No. PCT/US2024/047154 mailed Nov. 29, 2024.

* cited by examiner

*Primary Examiner* — Dinah Baria
(74) *Attorney, Agent, or Firm* — Carlson, Gaskey & Olds, P.C.

(57) ABSTRACT

This disclosure relates to orthopaedic implants and methods for restoring functionality to a bone and/or joint. The implants disclosed herein may be dimensioned and/or positioned relative to a bone to establish a constraint. The implants may include an articular surface establishing the constraint. The articular surface may have different radii of curvature to establish a non-spherical contour.

20 Claims, 6 Drawing Sheets

CONSTRAINED ORTHOPAEDIC IMPLANTS AND METHODS OF REPAIR

BACKGROUND

This disclosure relates to orthopaedic procedures and, more particularly, to orthopaedic implant systems and methods for repairing bone defects and restoring functionality to joints.

Many bones of the human musculoskeletal system include articular surfaces. The articular surfaces cooperate to facilitate different types and degrees of joint movement. The articular surfaces can erode or experience bone loss over time due to repeated use or wear, which may cause joint instability and pain. Bone deficiencies may occur along the articular surfaces of the glenoid bone. Some techniques utilize an implant to repair the articular surfaces. The implant may be secured to the glenoid utilizing one or more fasteners.

SUMMARY

An orthopaedic implant for shoulder arthroplasty may include an implant body that may extend along a central axis between a front face and a rear face. The rear face may be dimensioned to abut bone. An anchor member may extend outwardly from the rear face. The anchor member may be dimensioned to secure the implant body to bone. The front face may include a concave articular surface that may be dimensioned to mate with an opposed convex articular surface of an implant or bone. The articular surface may include a first non-spherical contour that may extend across a length of the front face between first and second lips that may establish a perimeter of the implant body. The first lip may be outward of the second lip relative to the central axis. A trough of the first contour may be established between the central axis and the second lip. A radius of curvature of the first contour may decrease from the trough towards the first lip.

An orthopaedic kit for a shoulder arthroplasty may include a humeral implant that may include a convex articular surface. The humeral implant may be securable to a humerus. The kit may include a glenoid implant that may be securable to a glenoid. The glenoid implant may include an implant body that may extend between a lateral face and a medial face. The medial face may be dimensioned to abut bone. At least one anchor member may extend outwardly from the medial face to secure the implant body. The lateral face may include a concave articular surface that may be dimensioned to mate with the convex articular surface of the humeral implant. The concave articular surface may include a first non-spherical contour that may extend across a length of the lateral face between superior and inferior lips that may establish a perimeter of the implant body. The superior lip may be lateral of the inferior lip to establish a superior constraint that may be dimensioned to limit superior movement of the humeral implant. A trough of the first contour may be relatively closer to the inferior lip than the superior lip.

A method of performing a shoulder arthroplasty may include positioning a glenoid implant relative to a glenoid of a patient. The glenoid implant may include an implant body that may extend between a lateral face and a medial face that may abut the glenoid. An anchor member may extend from the medial face to secure the implant body to the glenoid. The lateral face may include a first concave, non-spherical articular surface having a first contour that may extend in a superior-inferior direction of the glenoid between an inferior lip and a superior lip that may be lateral of the inferior lip to establish a superior constraint. A trough of the first contour may be relatively closer to the inferior lip than the superior lip. A radius of curvature of the first contour may decrease from a trough of the first contour towards the superior lip. The method may include positioning the articular surface in abutment with an opposed convex articular surface of an implant or bone such that the superior constraint may limit movement of the opposed articular surface in the superior direction.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
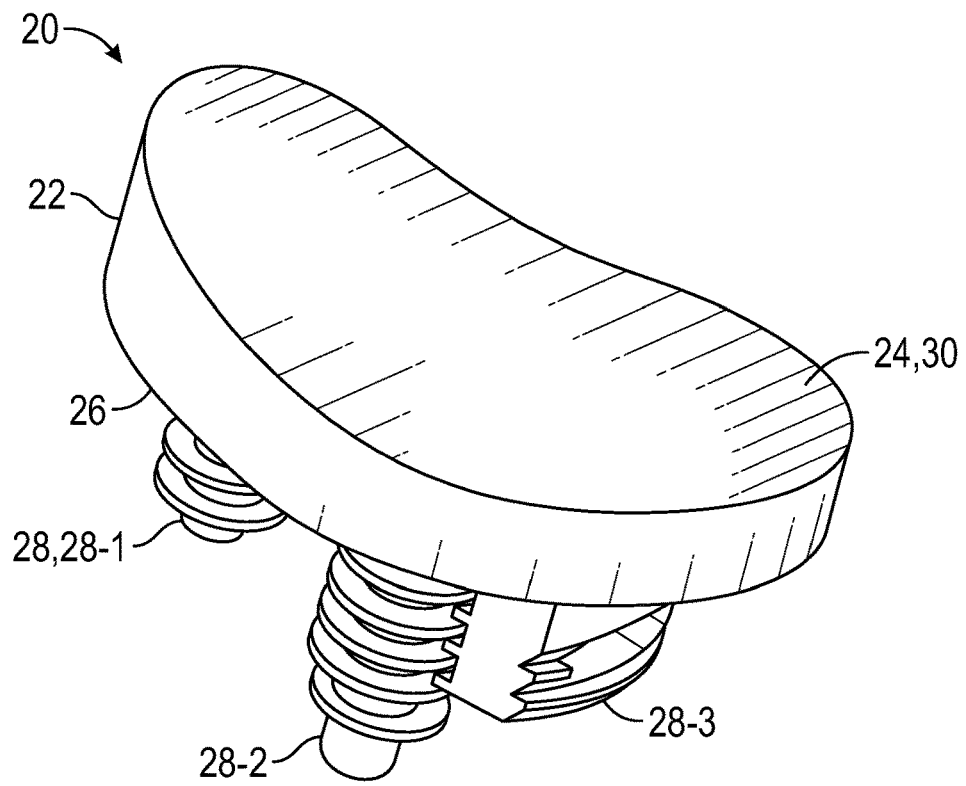
FIG. 1 discloses a perspective view of an implant.

This disclosure relates to orthopaedic implant systems and methods for repairing bone defects and restoring functionality to various bones joints. In implementations, the disclosed techniques may be utilized to restore functionality to a shoulder joint during an anatomical total shoulder arthroplasty (TSA).

Glenoid inclination may improve clinical outcomes in anatomic TSA by restoring glenohumeral kinematics. Utilizing the techniques disclosed herein, the surgeon may establish glenoid inclination without reaming subchondral bone. The disclosed implants may be arranged in an "onlay" configuration in which a backside surface of the implant may sit on an articular surface of the glenoid. In other implementations, the disclosed implants may be arranged in an "inlay" configuration in which at least a portion of a periphery of the implant may be positioned in bone.

The disclosed techniques may be utilized to establish a (e.g., superior) constraint for limiting movement of an adjacent (e.g., humerus) bone or implant. The disclosed implants may include a (e.g., superior) augment portion for constraining movement of an opposed articular surface of the adjacent bone or implant. The constraint may be established in the superior direction. An articular surface of the adjacent implant may be spherical in shape. A first (e.g., superior) lip of the implant may be outward of a second (e.g., interior) lip relative to an implant axis. The superior lip may be relatively more lateral of the interior lip when the implant is secured to a bone of the patient. In implementations, the disclosed implants may include about 5 degrees or more (e.g., 6-10 degrees) superior augmentation (e.g., tilt) such that the superior lip may be lateral of the inferior lip.

The articular surface of the disclosed implants may include variable radii of curvature in a lengthwise (e.g., superior/inferior) direction. The radius of curvature may decrease from a trough of the articular surface relative to the lengthwise direction. The radius of curvature of a first (e.g., superior) portion of the articular surface may be the same or may differ from a second (e.g., inferior) portion of the articular surface relative to the lengthwise direction. The variable radii may be utilized to establish a superior constraint with a relatively lesser superior implant thickness.

The articular surface may include variable radii of curvature in a widthwise (e.g., anterior/posterior) direction. The articular surface may be established such that the radius of curvature may decrease in a direction from the trough towards first and/or second (e.g., anterior and/or posterior) lips. The surgeon may rotate (e.g., tilt) the entire implant approximately 5 to 10 degrees to provide and/or increase the superior constraint.

An orthopaedic implant for shoulder arthroplasty may include an implant body that may extend along a central axis between a front face and a rear face. The rear face may be dimensioned to abut bone. An anchor member may extend outwardly from the rear face. The anchor member may be dimensioned to secure the implant body to bone. The front face may include a concave articular surface that may be dimensioned to mate with an opposed convex articular surface of an implant or bone. The articular surface may include a first non-spherical contour that may extend across a length of the front face between first and second lips that may establish a perimeter of the implant body. The first lip may be outward of the second lip relative to the central axis. A trough of the first contour may be established between the central axis and the second lip. A radius of curvature of the first contour may decrease from the trough towards the first lip.

In any implementations, a maximum depth position of the articular surface may be established at the trough.

In any implementations, a tangent line may be established relative to the first contour at the trough. The first contour may be dimensioned such that the tangent line may be inclined toward the first lip. The tangent line may be transverse to the central axis.

In any implementations, the anchor member may extend along the central axis.

In any implementations, the first contour may extend along a reference plane that may intersect the first and second lips. The central axis may extend along the reference plane. A perimeter of the articular surface between the first and second lips projected onto the reference plane may establish an arcuate peripheral contour that may include ends joined with respective ends of the first contour. A trough of the peripheral contour may be established between, but may be spaced apart from, the first lip and the trough of the first contour.

In any implementations, a second non-spherical contour of the articular surface may extend across a width of the front face at the trough. A radius of curvature of the second contour may decrease from the trough towards a perimeter of the articular surface.

In any implementations, a perimeter of the implant body may have an oblong geometry. A profile of the first contour may differ from a profile of the second contour.

In any implementations, a radius of curvature across a first width of the articular surface adjacent to the first lip may be greater than a radius of curvature across a second width of the articular surface adjacent to the second lip.

In any implementations, the radius of curvature may progressively decrease from the trough to the first lip.

In any implementations, a first thickness of the implant body at the first lip may be greater than a second thickness of the implant body at the second lip. A third thickness of the implant body at the trough may be greater than the second thickness but is less than the first thickness. A ratio of the first thickness to the second thickness may be equal to or greater than 1.4:1.

An orthopaedic kit for a shoulder arthroplasty may include a humeral implant that may include a convex articular surface. The humeral implant may be securable to a humerus. The kit may include a glenoid implant that may be securable to a glenoid. The glenoid implant may include an implant body that may extend between a lateral face and a medial face. The medial face may be dimensioned to abut bone. At least one anchor member may extend outwardly from the medial face to secure the implant body. The lateral face may include a concave articular surface that may be dimensioned to mate with the convex articular surface of the humeral implant. The concave articular surface may include a first non-spherical contour that may extend across a length of the lateral face between superior and inferior lips that may establish a perimeter of the implant body. The superior lip may be lateral of the inferior lip to establish a superior constraint that may be dimensioned to limit superior movement of the humeral implant. A trough of the first contour may be relatively closer to the inferior lip than the superior lip.

In any implementations, a radius of curvature of the first contour may decrease from the trough towards the superior lip.

In any implementations, a maximum depth position of the articular surface may be established at the trough.

In any implementations, a tangent line may be established relative to the first contour at the trough. The first contour may be dimensioned such that the tangent line may be inclined toward the superior lip.

In any implementations, a second non-spherical contour of the articular surface of the glenoid implant may extend across a width of the lateral face. A radius of curvature of the second contour may decrease from a trough of the second contour towards a perimeter of the articular surface of the glenoid implant.

A method of performing a shoulder arthroplasty may include positioning a glenoid implant relative to a glenoid of a patient. The glenoid implant may include an implant body that may extend between a lateral face and a medial face that may abut the glenoid. An anchor member may extend from the medial face to secure the implant body to the glenoid. The lateral face may include a first concave, non-spherical articular surface having a first contour that may extend in a superior-inferior direction of the glenoid between an inferior lip and a superior lip that may be lateral of the inferior lip to establish a superior constraint. A trough of the first contour may be relatively closer to the inferior lip than the superior lip. A radius of curvature of the first contour may decrease from a trough of the first contour towards the superior lip. The method may include positioning the articular surface in abutment with an opposed convex articular surface of an implant or bone such that the superior constraint may limit movement of the opposed articular surface in the superior direction.

In any implementations, the positioning step may occur such that the medial face may be seated against an articular surface of the glenoid.

In any implementations, a tangent line may be established relative to the trough. A superior portion of the tangent line may be lateral of an inferior portion of the tangent line relative to the glenoid. The tangent line may be inclined at a greater angle than the medial face of the implant body relative to the glenoid.

In any implementations, the tangent line may be non-perpendicular to an axis of the anchor member.

In any implementations, the first contour may extend along a reference plane that may extend in the superior-inferior direction to intersect the superior and inferior lips. A perimeter of the articular surface between the superior and inferior lips projected onto the reference plane may establish an arcuate peripheral contour including ends joined with respective ends of the first contour. A trough of the peripheral contour may be medial of lateralmost portions of superior and inferior lips.

FIGS. 1-7 disclose an orthopedic implant 20 according to an implementation. The implant 20 may be utilized in various orthopedic procedures to restore functionality to bones and/or joints such as a shoulder joint during an anatomical or reverse shoulder arthroplasty. In implementations, the implant 20 may be utilized to restore articular surfaces of a glenoid. The implant 20 may be utilized to restore functionality to other bones and joints such as a knee, hip, elbow, wrist or ankle.

Figure 2:
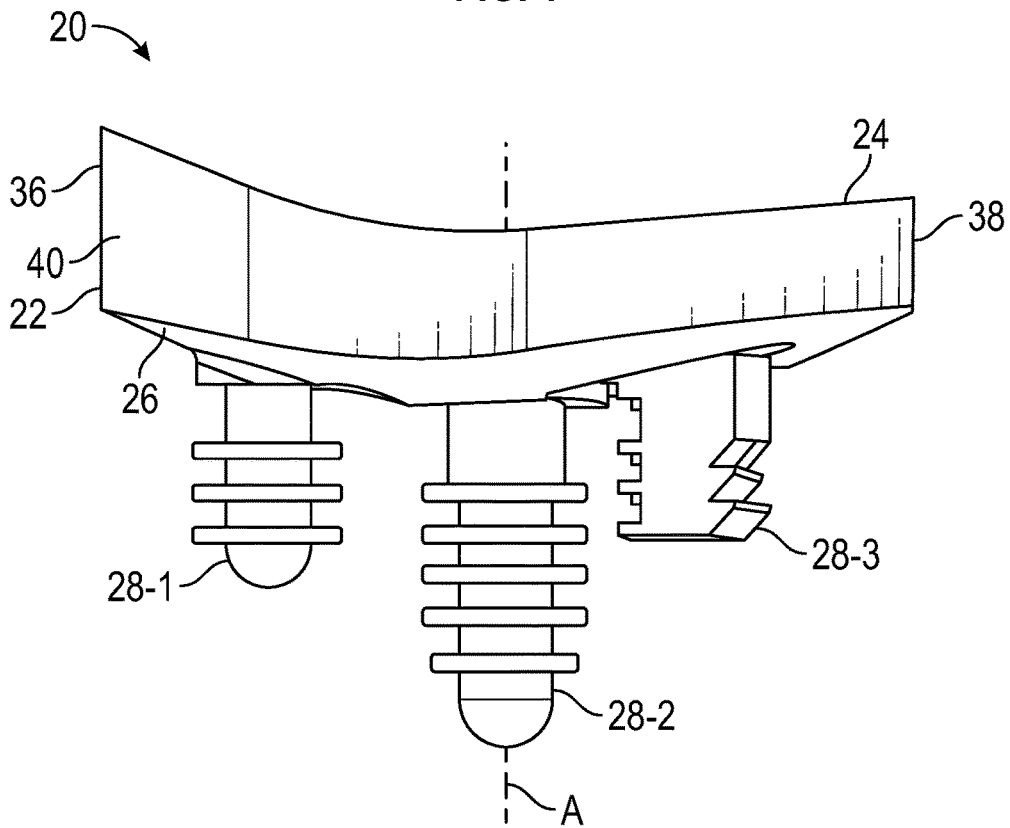
FIG. 2 discloses a side view of the implant of FIG. 1.
Figure 3:
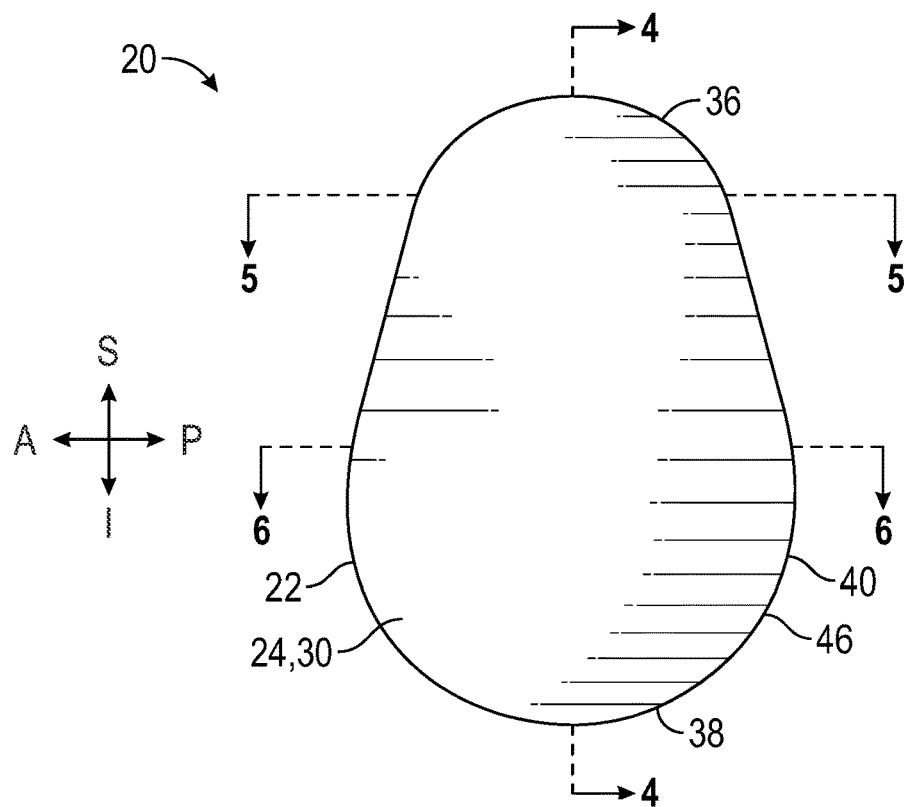
FIG. 3 discloses a front view of the implant of FIG. 1.

Referring to FIGS. 1-3, the implant 20 may include an implant body 22 extending along an implant axis A between a first (e.g., front) face 24 and a second (e.g., rear) face 26. The implant axis A may be a central axis of the implant body 22. The front face 24 may have a concave geometry. The geometry of the rear face 26 may be the same or may differ from the front face 24. The rear face 26 may have a convex geometry (see, e.g., FIGS. 4-6). In other implementations, the rear face 26 may be substantially planar. The rear face 26 may be dimensioned to abut bone, such as the glenoid of a patient (see, e.g., FIG. 9). In implementations, the front face 24 may be a lateral face and the rear face 26 may be a medial face. The front face 24 may be lateral of the rear face 26 relative to the medial-lateral direction M/L when seated against the glenoid. Various materials may be utilized to form the implant 20, including metallic materials and/or non-metal materials such as polyethylene.

The implant 20 may include one or more anchor members 28 for securing the implant 20 to bone. The anchor members 28 may be dimensioned to extend outwardly from the rear face 26 to secure the implant body 22 to bone (see, e.g., bone B of FIG. 7). The implant 20 may include first, second and third anchor members 28-1, 28-2, 28-3. In implementations, the first and/or second anchor members 28-1, 28-2 may be an elongated post. The third anchor member 28-3 may have an arcuate profile to establish a keel. It should be understood that fewer or more than three anchor members 28 may be utilized in accordance with the teachings disclosed herein, such as only one anchor member 28. In other implementations, the anchor members 28 may be omitted. One of the anchor members 28 may extend along the axis A, such as the second anchor member 28-2.

The implant 20 may be dimensioned to establish a (e.g., superior) constraint for limiting movement of an opposed implant or bone. In implementations, the front face 24 may include a concave articular surface 30. The articular surface 30 may be dimensioned to mate with an opposed convex articular surface 32 of an implant or bone, such as a humeral implant 62 (see, e.g., FIG. 9). A perimeter 46 of the articular surface 30 may substantially follow, or may be spaced inwardly of, a perimeter 40 of the implant body 22. For the purposes of this disclosure, the terms "about," "approximately" and "substantially" mean ±10 percent of the stated value or relationship unless otherwise indicated.

Figure 4:
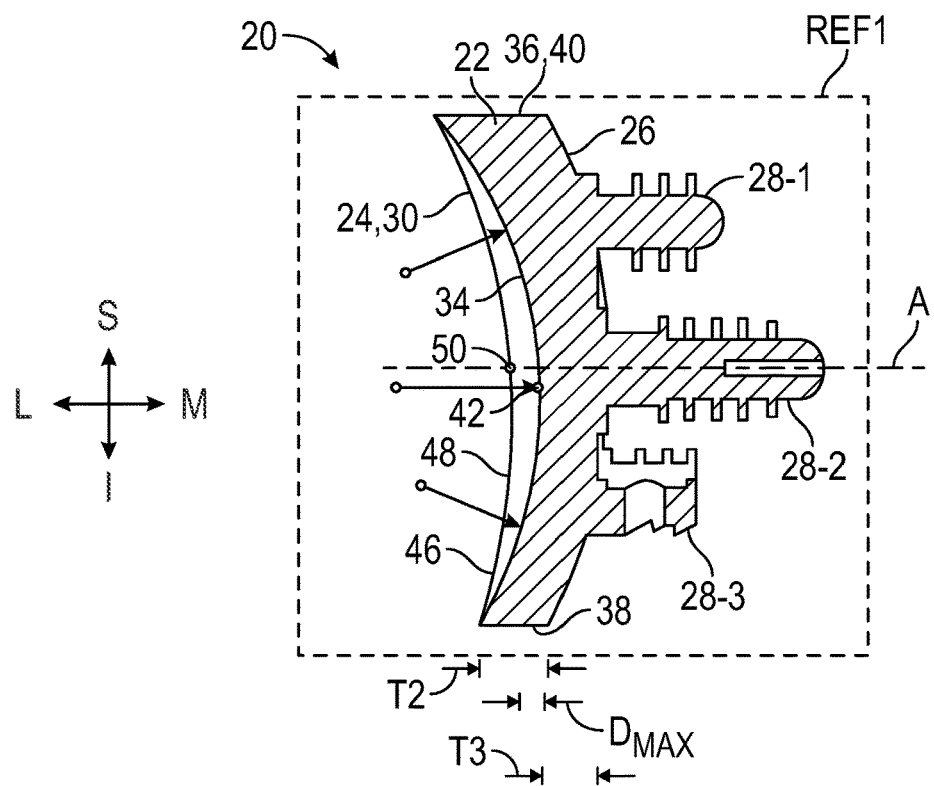
FIG. 4 discloses a sectional view taken along line 4-4 of FIG. 3.

Referring to FIG. 4, with continued reference to FIGS. 1-3, the articular surface 30 may have a generally bowl-shaped geometry. The articular surface 30 may include a first non-spherical contour 34. The first contour 34 may be established by two or more radii of curvature that vary from each other. The first contour 34 may extend across a length of the front face 24 between a first (e.g., superior) lip 36 and a second (e.g., inferior) lip 38. The superior and inferior lips 36, 38 may establish the perimeter 40 of the implant body 22. The superior lip 36 may be dimensioned to extend outward of the inferior lip 38 relative to the implant axis A for establishing a superior constraint.

The first contour 34 may include a first trough 42. The first trough 42 may establish an inflection point along the first contour 34. The first trough 42 may establish a bottom of the articular surface 30. The first trough 42 may be established at various positions relative to the perimeter 46 of the articular surface 30. The trough 42 may be relatively closer to the inferior lip 38 than the superior lip 36. In implementations, the trough 42 may be established between the implant axis A and the inferior lip 38.

The first contour 34 may be dimensioned such that a radius of curvature of the first contour 34 may decrease from the first trough 42 towards the perimeter 46 of the articular surface 30. In implementations, the first contour 34 may be dimensioned such that the radius of curvature of the first contour 34 may decrease from the first trough 42 towards the superior lip 36 and/or the inferior lip 38. A slope of the first contour 34 may progressively increase from the first trough 42 to the end(s) of the contour 34 at the perimeter 46 adjacent the superior lip 36 and/or the inferior lip 38. The radius curvature of the first contour 34 between the first trough 42 and the superior lip 36 may be the same or may differ from the radius curvature of the first contour 34 between the first trough 42 and the inferior lip 38. In implementations, the radius of curvature of the first contour 34 may progressively decrease from the first trough 42 to the superior lip 36 and/or the inferior lip 38. In implementations, the radius of curvature of the first contour 34 may decrease from about 33.5 mm at the trough 42 of the articular surface 30 to about 29.0 mm at the superior lip 36 relative to the lengthwise (e.g., superior-inferior) direction.

A maximum depth $D_{MAX}$ of the articular surface 30 may be established between the articular surface 30 and a plane across the front face 24 of the implant body 22. A position of the maximum depth $D_{MAX}$ of the articular surface 30 may be established along, or otherwise adjacent to, the first contour 34. The position of the maximum depth $D_{MAX}$ of the articular surface 30 may be established at the first trough 42. In other implementations, the maximum depth $D_{MAX}$ position may be spaced apart from the first trough 42.

Figure 5:
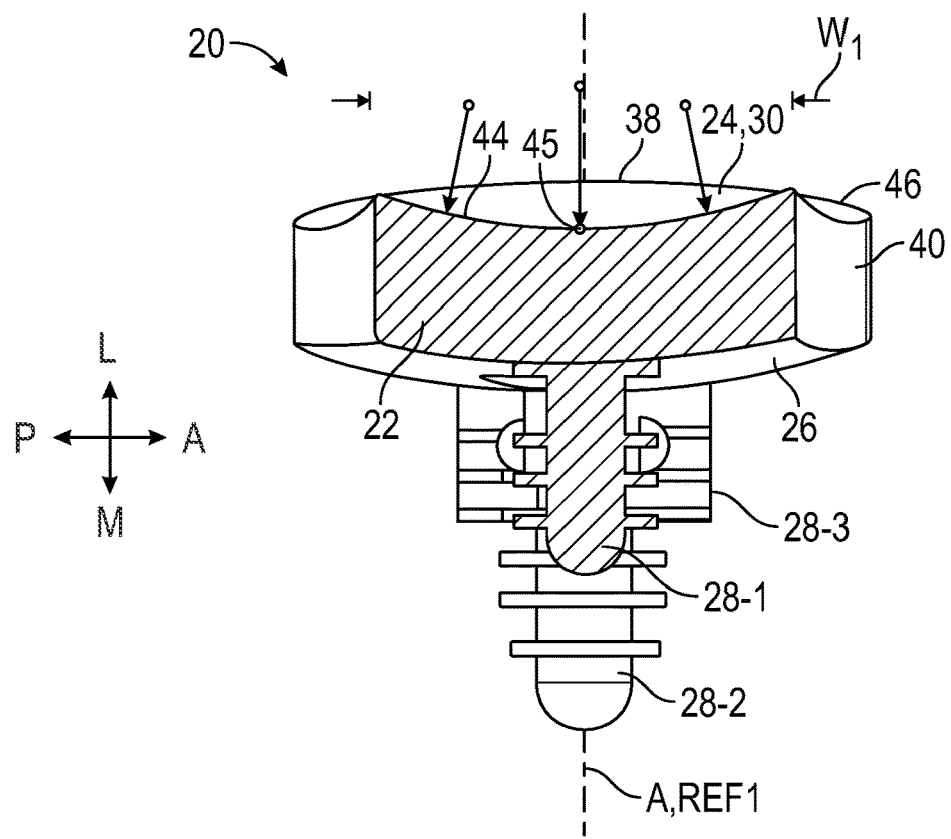
FIG. 5 discloses a sectional view taken along line 5-5 of FIG. 3.
Figure 6:
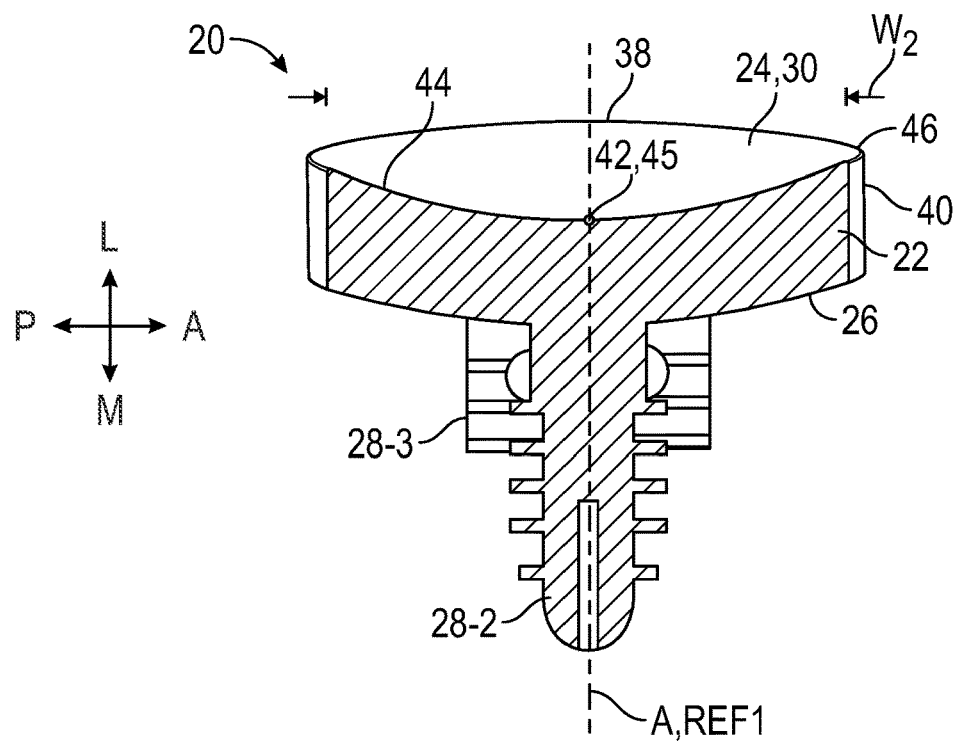
FIG. 6 discloses a sectional view taken along line 6-6 of FIG. 3.

Referring to FIGS. 5-6, with continuing reference to FIGS. 1-4, the articular surface 30 may be contoured in a direction transverse to the first contour 34. A second non-spherical contour 44 of the articular surface 30 may extend across the width of the front face 24. Different contours 44 may be established across the width of the implant body 22 at respective positions along the first contour 34 (cf. FIGS.

5-6). The second contour 44 may be established by two or more radii of curvature that may vary from each other. The second contour 44 may include a second trough 45. The second trough 45 may establish an inflection point along the second contour 44. The second trough 45 may establish the bottom of the articular surface 30. The second trough 45 of the second contour 44 may be substantially aligned with the first trough 42 of the first contour 42. The second contour 44 may extend across the width of the front face 24 at the first trough 42 of the first contour 34 (see, e.g., FIG. 6). In implementations, the radius of curvature of the second contour 44 may decrease from the second trough 45 towards the perimeter 46 of the articular surface 30. In implementations, the radius of curvature of the second contour 44 may progressively decrease from the second trough 45 to the perimeter 46 of the articular surface 30. The first contour 34 and the second contour 44 may extend along respective planes that may be substantially perpendicular to each other.

The perimeters 40, 46 of the implant body 22 and the articular surface 30 may have various geometries. In the implementation of FIG. 3, the perimeter 40 of the implant body 22 and/or the perimeter 46 of the articular surface 30 may have an oblong or other non-circular geometry. The articular surface 30 may be dimensioned such that a profile of the first contour 34 may differ from a profile of the second contour 44. In the implementation of FIGS. 5-6, the radius of curvature across a first width W1 of the articular surface 30 adjacent to the superior lip 36 (see, e.g., FIGS. 3 and 5) may be greater than the radius of curvature across a second width W2 of the articular surface 30 adjacent to the inferior lip 38 (see, e.g., FIGS. 3 and 6). Other geometries may be utilized in accordance with the teachings disclosed herein. In implementations, the perimeters 40 and/or 46 may have an elliptical (e.g., circular) geometry.

The implant body 22 may have various geometries for constraining the opposed convex articular surface 32 of the adjacent bone or implant. In the implementation of FIG. 4, a first thickness T1 of the implant body 22 at the superior lip 36 may be greater than a second thickness T2 of the implant body 22 at the inferior lip 38. In implementations, the rear surface 26 at the superior lip 36 may be substantially aligned with the rear face 26 at the inferior lip 38 relative to the medial/lateral direction M/L. A third thickness T3 of the implant body 22 at the first trough 42 may be greater than the second thickness T2 but may be less than the first thickness T1. In implementations, a ratio of the first thickness T1 to the second thickness T2 may be equal to or greater than 1.4:1, or more narrowly less than or equal to 2:1.

The front face 24 may have various geometries to constrain the opposing articular surface 32 of an adjacent bone or implant. In implementations, the front face 24 may be substantially planar. In other implementations, the front face 24 may have an arcuate geometry. In the implementation of FIG. 4, the first contour 34 may extend along a first reference plane REF1 (shown in dashed lines). The implant 20 may be substantially symmetrical relative to the reference plane REF1. The reference plane REF1 may extend in the superior-inferior direction S/I and/or medial-lateral direction M/L. The reference plane REF1 may intersect the superior and inferior lips 36, 38. The implant axis A may extend along the first reference plane REF1. A portion of the perimeter 46 of the articular surface 30 between the first and second lips 36, 38 may be projected onto the reference plane REF1 to establish an arcuate peripheral contour 48. The peripheral contour 48 may include ends joined with respective ends of the first contour 42. A third trough 50 of the peripheral contour 48 may be established between, but may be spaced apart from, the superior lip 36 and the first trough 42 of the first contour 34 relative to the reference plane REF1. Utilizing the techniques disclosed herein, the profile of the perimeter 46 of the articular surface 30 may provide a (e.g., interior and/or posterior) constraint to limit movement of the opposed convex articular surface 32 (see e.g., FIG. 9).

Figure 8:
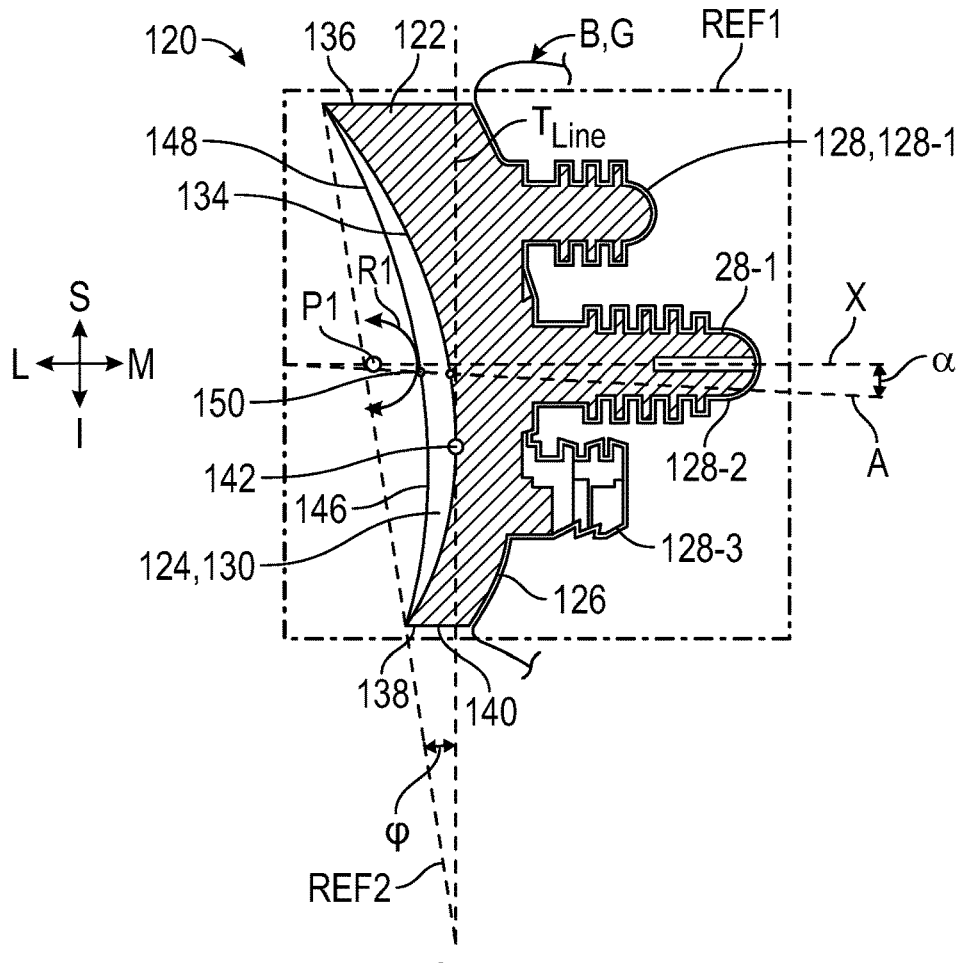
FIG. 8 discloses a sectional view of an implant positioned relative to bone according to another implementation.

Referring to FIG. 8, an orthopedic implant 120 according to another implementation is disclosed. An articular surface 130 of the implant 120 may include a first non-spherical contour 134. The articular surface 130, including the first contour 134, may be dimensioned according to any of the techniques disclosed herein. The first contour 134 may be established by two or more radii of curvature that may vary from each other. A tangent line $T_{LINE}$ may be established relative to the first contour 134 at a first trough 142. The tangent line $T_{LINE}$ may be transverse to the axis A. The tangent line $T_{LINE}$ may extend along a first reference plane REF1. The tangent line $T_{LINE}$ may be relatively closer to a (e.g., superior) first lip 136 than a second (e.g., inferior) lip 138 of the implant body 122. The first contour 134 may be dimensioned such that the tangent line $T_{LINE}$ may be tilted (e.g., inclined) towards the superior lip 136. The tangent line $T_{LINE}$ may be perpendicular to an axis X. An angle α may be established between the implant axis A and the axis X. The angle α may be equal to or greater than approximately 5 degrees such that the articular surface 132 may be tilted to establish a (e.g., superior) constraint. The angle α may be equal to or greater than approximately 10 degrees and/or may be less than or equal to 25 degrees. The implant 120 may be seated against the bone B to establish the angle α relative to the bone B, which may be specified in a preoperative plan.

A portion of the perimeter 146 of the articular surface 130 between the first and second lips 136, 138 may be projected onto the reference plane REF1 to establish an arcuate peripheral contour 148. The peripheral contour 148 may include a trough 150. The articular surface 130 may be dimensioned such that the trough 150 of the peripheral contour 148 may be inward of the superior and inferior lips 136, 138 relative to the implant axis A. The trough 150 may be medial of the lateralmost portions of the superior and inferior lips 136, 138 relative to the medial-lateral direction M/L when positioned relative to the bone B.

A second reference plane REF2 may be established between the (e.g., superior and inferior) ends of the first contour 134. The tangent line $T_{LINE}$ may intersection the second reference plane REF2 to establish a third angle. The superior end may be lateral of the inferior end of the first contour 134 such that the third angle φ may be equal to or greater than five degrees, or more narrowly may be greater than or equal to 10 degrees. The third angle φ may be equal to or greater than the first angle α. In implementations, a constraint ratio of the third angle φ to the first angle α may be equal to or greater than 3:2, or more narrowly greater than or equal to 2:1. The constraint ratio may be less than or equal to 3:1. Utilizing the dimensional relationships disclosed herein, the articular surface 30/130 may facilitate range of motion of the adjacent bone and establish a constraint that may limit a likelihood of dislocation and/or impingement with bony structures adjacent to the joint.

Figure 9:
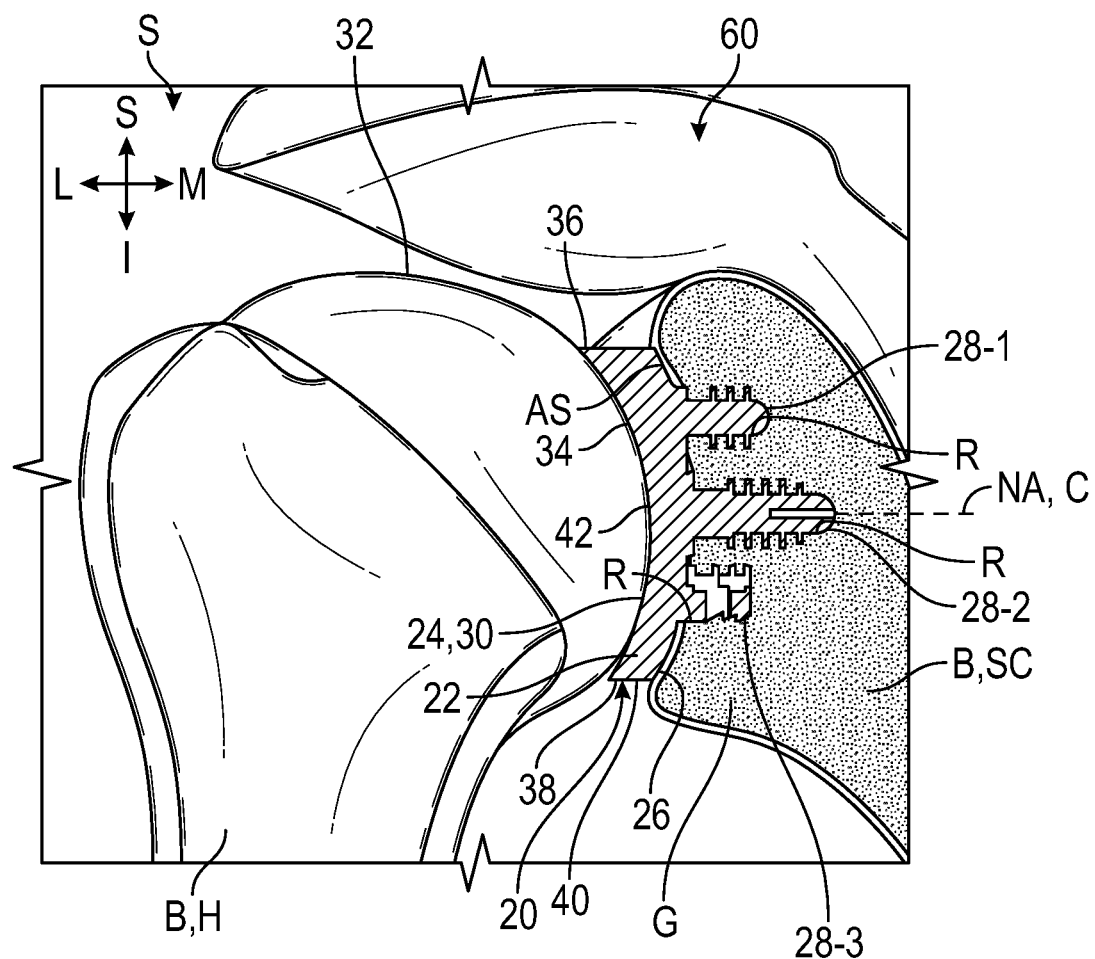
FIG. 9 discloses the implant of FIG. 4 positioned relative to an adjacent implant.

Referring to FIG. 9, with continuing reference to FIGS. 1-7, an orthopaedic kit 60 is disclosed according to an implementation. The kit 60 may incorporate any of the implants disclosed herein. The kit 60 may be utilized in various orthopedic procedures to restore functionality to bones and/or joints, including any of the bones and/or joints disclosed herein, such as a shoulder joint during an anatomical or reverse shoulder arthroplasty. The kit 60 may incorporate the implants 20, 62 securable to adjacent bones of a joint. In implementations, the implant 20 may be a glenoid implant securable to the glenoid of a patient, and the implant 62 may be a humeral implant securable to a humerus of a patient, or vice versa. The superior lip 36 of the implant 20 may be lateral of the inferior lip 38 to establish a superior constraint dimensioned to limit superior movement of the humeral implant 62 relative to the superior-inferior direction S/I.

Figure 10:
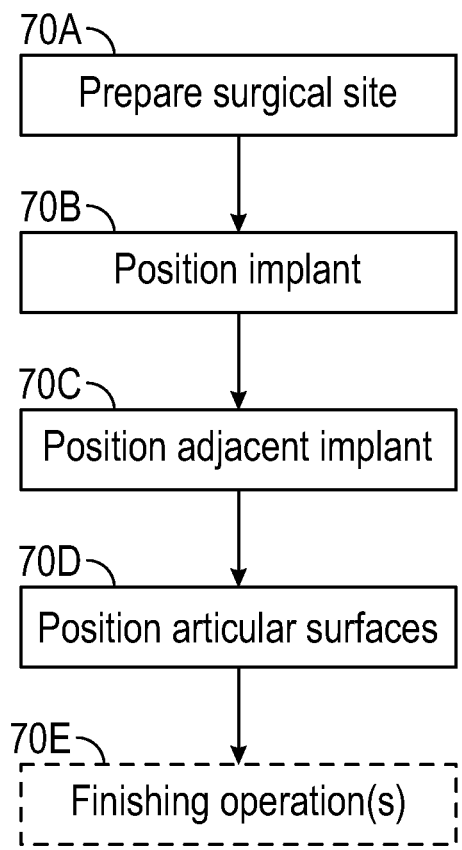
FIG. 10 discloses a method of installing an orthopaedic implant system.

FIG. 10 discloses a method of performing an arthroplasty in a flow chart 70 according to an implementation. The method 70 may be utilized to perform an arthroplasty to restore functionality to a bone and/or joint, including any of the bones and joints disclosed herein. In implementations, the method 70 may be utilized in an anatomical shoulder or reverse shoulder arthroplasty. The method 70 can be utilized in accordance with any of the implants disclosed herein, including the implants 20, 120. Reference is made to the implant system 20. Fewer or additional steps than are recited below could be performed within the scope of this disclosure, and the recited order of steps is not intended to limit this disclosure.

The disclosed implants 20, 120 may be provided to the surgeon as a kit, such as the kit 60. The kit may include components of various shapes and sizes. Components may be selected from the kit to establish a specified configuration according to an anatomy of the patient and other aspects of a surgical plan.

Referring to FIGS. 9-10, at step 70A a surgical site S may be prepared. The surgical site S may be associated with a shoulder joint established by a humerus H and scapula SC of a patient. Step 70A may include establishing one or more recesses R in bone B, such as the glenoid G. Step 70A may include removing bone B from an articular surface AS of the glenoid G.

At step 70B, the glenoid implant 20 may be positioned relative to the glenoid G. Various techniques may be utilized to position the implant 20. The rear (e.g., medial) face 26 may be seated against the glenoid G to establish an onlay configuration. The rear face 26 may be seated against the articular surface AS of the glenoid G. In other implementations, the rear face 26 may be received in a recess formed in the glenoid G to establish an inlay configuration. The implant 20 may be positioned relative to the glenoid G such that the first contour 34 may extend substantially in the superior-inferior direction S/I between the superior and inferior lips 36, 38. The superior lip 36 may be lateral of the inferior lip 38 to establish a superior constraint. The radius of curvature of the first contour 34 may decrease from the trough 42 of the first contour 34 towards the superior lip 36 and/or inferior lip 38.

One or more anchor members 28 may extend from the medial face 26. Step 70B may include at least partially inserting each anchor member 28 in a respective recess R to secure the implant body 22 to the glenoid G. Step 70B may include securing the implant 20 with one or more fasteners, bone cement, etc.

Figure 7:
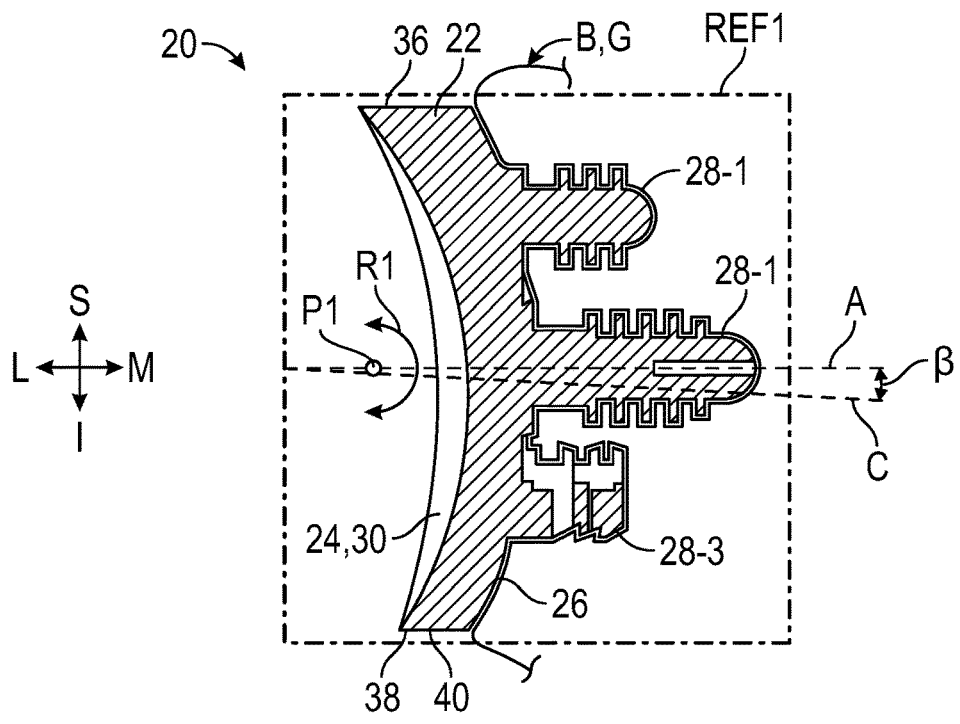
FIG. 7 discloses the implant of FIG. 4 positioned relative to bone.

In the implementation of FIG. 7, the implant 20 may be rotated in a direction R1 about a point P1 to establish and/or increase the superior constraint. The point P1 may be established along the first reference plane REF1, which may extend in the superior/inferior direction S/I and/or medial/lateral direction M/L. The implant axis A may establish an (e.g., inclination) angle β relative to an axis C. The axis C may extend in the medial-lateral M/L direction (see also FIG. 9). The inclination angle β may be equal to or greater than approximately 5 degrees such that the articular surface 32 may be tilted to establish a superior constraint. The inclination angle β may be equal to or greater than approximately 10 degrees and/or may be less than or equal to 25 degrees. In other implementations, the inclination angle β may be less than 5 degrees. In the implementation of FIG. 9, the implant axis A may be substantially aligned with the axis C such that the inclination angle β may be approximately 0 degrees. The implant 20 may be seated against the glenoid G and/or another bone B to establish the inclination angle β, which may be specified in a preoperative plan.

In the implementation of FIG. 8, the tangent line $T_{LINE}$ may be established relative to the trough 142. The implant 120 may be seated against the bone B such that a superior portion of the tangent line $T_{LINE}$ may be lateral of an inferior portion of the tangent line $T_{LINE}$ relative to the glenoid G. The tangent line $T_{LINE}$ may be inclined at a greater angle than the medial face 126 of the implant body 122 relative to the glenoid G at the axis A. The tangent line $T_{LINE}$ may be non-perpendicular to an axis of the anchor member 128-2 and/or the implant axis A. In implementations, the surgeon may rotate (e.g., tilt) the implant 20/120 approximately 5 to 10 degrees in the rotational direction R1 about the point P1 to provide and/or increase the superior constraint (see, e.g., FIGS. 7-8).

Referring back to FIGS. 9-10, at step 70C an adjacent implant may be positioned relative to an adjacent bone B, such as the humerus H. In implementations, the adjacent implant may be the humeral implant 62 positioned relative to the humerus H. The humeral implant 62 may include a stem portion insertable into an intramedullary canal of the humerus H.

At step 70D, the articular surface 30 of the glenoid implant 20 may be positioned in abutment with an opposed convex articular surface 32 to restore functionality to the joint. The articular surface 32 may be established by the implant 62 or a bone B, such as the humerus H. Positioning the articular surfaces 30, 32 in abutment may occur such that the superior constraint established by the articular surface 30 of the glenoid implant 20 may limit movement of the articular surface 32 of the humeral implant 62 in the superior direction S. In other implementations, the articular surface 30 may establish an inferior constraint that may limit movement of the articular surface 32 of the humeral implant 62 in the inferior direction I.

Method 70 may include one or more additional steps performed prior, during, and/or subsequent to steps 70A-70D. Method 70 may include one or more finishing operations at step 70E. The finishing operations may include repairing soft tissue and/or closing a wound.

The novel implant systems and methods of this disclosure may provide versatility in repairing bone defects for restoring functionality to bones and/or joints. The disclosed implants may be dimensioned to establish a constraint for limiting movement of an adjacent implant or bone. An articular surface of the implant may be dimensioned to include different radii of curvature for establishing the constraint. The surgeon may rotate the implant to establish and/or increase the constraint. Utilizing the techniques disclosed herein, a likelihood of dislocation and/or impingement may be reduced.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should further be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure.

What is claimed is:

1. An orthopaedic implant for shoulder arthroplasty comprising:
    an implant body extending along a central axis between a front face and a rear face, the rear face dimensioned to abut bone, and an anchor member extending outwardly from the rear face, the anchor member dimensioned to secure the implant body to bone;
    wherein the front face includes a concave articular surface dimensioned to mate with an opposed convex articular surface of an implant or bone, the articular surface including a first non-spherical contour extending across a length of the front face between first and second lips that establish a perimeter of the implant body, and the first lip is outward of the second lip relative to the central axis;
    wherein a trough of the first contour is established between the central axis and the second lip, and a radius of curvature of the first contour decreases from the trough towards the first lip; and
    wherein a second non-spherical contour of the articular surface extends across a width of the front face at the trough, and a radius of curvature of the second contour decreases from the trough towards a perimeter of the articular surface.

2. The implant as recited in claim 1, wherein a maximum depth position of the articular surface is established at the trough.

3. The implant as recited in claim 2, wherein a tangent line is established relative to the first contour at the trough, the first contour is dimensioned such that the tangent line is inclined toward the first lip, and the tangent line is transverse to the central axis.

4. The implant as recited in claim 2, wherein:
    the first contour extends along a reference plane that intersects the first and second lips, and the central axis extends along the reference plane;
    a perimeter of the articular surface between the first and second lips projected onto the reference plane establishes an arcuate peripheral contour including ends joined with respective ends of the first contour; and
    a trough of the peripheral contour is established between, but is spaced apart from, the first lip and the trough of the first contour.

5. The implant as recited in claim 1, wherein:
    the perimeter of the implant body has an oblong geometry; and
    a profile of the first contour differs from a profile of the second contour.

6. The implant as recited in claim 5, wherein a radius of curvature across a first width of the articular surface adjacent to the first lip is greater than a radius of curvature across a second width of the articular surface adjacent to the second lip.

7. The implant as recited in claim 1, wherein the radius of curvature progressively decreases from the trough to the first lip.

8. The implant as recited in claim 1, wherein:
    a first thickness of the implant body at the first lip is greater than a second thickness of the implant body at the second lip;
    a third thickness of the implant body at the trough is greater than the second thickness but is less than the first thickness; and
    a ratio of the first thickness to the second thickness is equal to or greater than 1.4:1.

9. The implant as recited in claim 1, wherein:
    the anchor member extends along the central axis.

10. The implant as recited in claim 1, wherein:
    a profile of the first contour differs from a profile of the second contour.

11. The implant as recited in claim 1, wherein:
    a first thickness of the implant body at the first lip is greater than a second thickness of the implant body at the second lip; and
    a third thickness of the implant body at the trough is greater than the second thickness but is less than the first thickness.

12. An orthopaedic implant for shoulder arthroplasty comprising:
    an implant body extending along a central axis between a front face and a rear face, the rear face dimensioned to abut bone, and an anchor member extending outwardly from the rear face, the anchor member dimensioned to secure the implant body to bone;
    wherein the front face includes a concave articular surface dimensioned to mate with an opposed convex articular surface of an implant or bone, the articular surface including a first non-spherical contour extending across a length of the front face between first and second lips that establish a perimeter of the implant body, and the first lip is outward of the second lip relative to the central axis;
    wherein a trough of the first contour is established between the central axis and the second lip, and a radius of curvature of the first contour decreases from the trough towards the first lip;
    wherein a maximum depth position of the articular surface is established at the trough; and
    wherein a tangent line is established relative to the first contour at the trough, the first contour is dimensioned such that the tangent line is inclined toward the first lip, and the tangent line is transverse to the central axis.

13. The implant as recited in claim 12, wherein:
    the anchor member extends along the central axis.

14. An orthopaedic implant for shoulder arthroplasty comprising:
    an implant body extending along a central axis between a front face and a rear face, the rear face dimensioned to abut bone, and an anchor member extending outwardly from the rear face, the anchor member dimensioned to secure the implant body to bone;
    wherein the front face includes a concave articular surface dimensioned to mate with an opposed convex articular surface of an implant or bone, the articular surface including a first non-spherical contour extending across a length of the front face between first and second lips that establish a perimeter of the implant body, and the first lip is outward of the second lip relative to the central axis;

wherein a trough of the first contour is established between the central axis and the second lip, and a radius of curvature of the first contour decreases from the trough towards the first lip;

wherein a maximum depth position of the articular surface is established at the trough; and wherein the first contour extends along a reference plane that intersects the first and second lips, and the central axis extends along the reference plane;

wherein a perimeter of the articular surface between the first and second lips projected onto the reference plane establishes an arcuate peripheral contour including ends joined with respective ends of the first contour; and wherein a trough of the peripheral contour is established between, but is spaced apart from, the first lip and the trough of the first contour.

15. An orthopaedic kit for a shoulder arthroplasty, comprising:

a humeral implant including a convex articular surface, the humeral implant securable to a humerus; and a glenoid implant securable to a glenoid, the glenoid implant comprising:

an implant body extending between a lateral face and a medial face, the medial face dimensioned to abut bone, and at least one anchor member extending outwardly from the medial face to secure the implant body;

wherein the lateral face includes a concave articular surface dimensioned to mate with the convex articular surface of the humeral implant, the concave articular surface including a first non-spherical contour extending across a length of the lateral face between superior and inferior lips that establish a perimeter of the implant body, and the superior lip is lateral of the inferior lip to establish a superior constraint dimensioned to limit superior movement of the humeral implant;

wherein a trough of the first contour is closer to the inferior lip than the superior lip; and wherein a second non-spherical contour of the articular surface of the glenoid implant extends across a width of the lateral face, and a radius of curvature of the second contour decreases from a trough of the second contour towards a perimeter of the articular surface of the glenoid implant.

16. The kit as recited in claim 15, wherein a radius of curvature of the first contour decreases from the trough towards the superior lip.

17. The kit as recited in claim 16, wherein a tangent line is established relative to the first contour at the trough, and the first contour is dimensioned such that the tangent line is inclined toward the superior lip.

18. The kit as recited in claim 15, wherein a maximum depth position of the articular surface is established at the trough.

19. An orthopaedic kit for a shoulder arthroplasty, comprising:

a humeral implant including a convex articular surface, the humeral implant securable to a humerus; and a glenoid implant securable to a glenoid, the glenoid implant comprising:

an implant body extending between a lateral face and a medial face, the medial face dimensioned to abut bone, and at least one anchor member extending outwardly from the medial face to secure the implant body;

wherein the lateral face includes a concave articular surface dimensioned to mate with the convex articular surface of the humeral implant, the concave articular surface including a first non-spherical contour extending across a length of the lateral face between superior and inferior lips that establish a perimeter of the implant body, and the superior lip is lateral of the inferior lip to establish a superior constraint dimensioned to limit superior movement of the humeral implant;

wherein a trough of the first contour is closer to the inferior lip than the superior lip;

wherein a radius of curvature of the first contour decreases from the trough towards the superior lip; and wherein a tangent line is established relative to the first contour at the trough, and the first contour is dimensioned such that the tangent line is inclined toward the superior lip.

20. The kit as recited in claim 19, wherein a maximum depth position of the articular surface is established at the trough.

* * * * *